US009332064B2

(12) United States Patent
Liao et al.

(10) Patent No.: US 9,332,064 B2
(45) Date of Patent: May 3, 2016

(54) COMPUTER SYSTEM AND REMOTE CONTROL METHOD THEREOF

(71) Applicant: Wistron Corporation, New Taipei (TW)

(72) Inventors: Wei-Cherng Liao, New Taipei (TW); Alexander I-Chi Lai, New Taipei (TW)

(73) Assignee: Wistron Corporation, New Taipei (TW)

( * ) Notice: Subject to any disclaimer, the term of this patent is extended or adjusted under 35 U.S.C. 154(b) by 141 days.

(21) Appl. No.: 14/197,227

(22) Filed: Mar. 5, 2014

(65) Prior Publication Data

US 2015/0134728 A1    May 14, 2015

(30) Foreign Application Priority Data

Nov. 11, 2013  (TW) .................................. 102140905

(51) Int. Cl.
*H04L 29/08* (2006.01)
*H04L 29/06* (2006.01)
*H04L 12/24* (2006.01)

(52) U.S. Cl.
CPC ............... *H04L 67/10* (2013.01); *H04L 41/00* (2013.01); *H04L 67/025* (2013.01); *H04L 67/42* (2013.01)

(58) Field of Classification Search
CPC ....................................................... H04L 67/10
USPC .......................................................... 709/203
See application file for complete search history.

(56) References Cited

U.S. PATENT DOCUMENTS

| 4,748,656 | A | * | 5/1988 | Gibbs | ..................... H04L 13/00 379/93.05 |
| 5,291,399 | A | * | 3/1994 | Chaco | ................... G06F 19/323 235/375 |
| 5,842,028 | A | * | 11/1998 | Vajapey | ................ G06F 1/3203 713/310 |
| 5,943,507 | A | * | 8/1999 | Cornish | ................... G06F 13/24 710/260 |
| 5,974,528 | A | * | 10/1999 | Tsai | ........................ G06F 8/665 710/14 |
| 5,974,552 | A | * | 10/1999 | Lim | ...................... G06F 9/4418 379/142.06 |
| 6,052,793 | A | * | 4/2000 | Mermelstein | ............. G06F 1/24 713/340 |

(Continued)

FOREIGN PATENT DOCUMENTS

| CN | 101272272 A | 9/2008 |
| CN | 100498715 C | 6/2009 |

(Continued)

OTHER PUBLICATIONS

AMD, "Am79C972", 2009.*

(Continued)

*Primary Examiner* — O. C. Vostal
(74) *Attorney, Agent, or Firm* — Jianq Chyun IP Office

(57) ABSTRACT

A computer system and a remote control method thereof are provided. The method is adapted for the computer system having a network and a processor. In the method, the network card is used to receive a management interface request sent by a remote device thorough a network and send a system management interrupt to the processor, so as to wake up the processor and control the processor to enter a system management mode. Then, the processor loads a management monitoring program into a memory so as to execute the management monitor program. Finally, the processor processes the management interface request by using the management monitoring program in the system management mode, and replies a processing result to the remote device through the network by using the network card.

10 Claims, 3 Drawing Sheets

(56) References Cited

U.S. PATENT DOCUMENTS

| | | | | |
|---|---|---|---|---|
| 6,119,228 | A * | 9/2000 | Angelo | H04L 41/28 380/255 |
| 6,212,560 | B1 * | 4/2001 | Fairchild | H04L 29/06 709/220 |
| 6,223,284 | B1 * | 4/2001 | Novoa | G06F 21/572 709/216 |
| 6,393,457 | B1 * | 5/2002 | Allison | H04L 47/6215 370/355 |
| 6,421,782 | B1 * | 7/2002 | Yanagisawa | G06F 1/1632 713/310 |
| 6,434,620 | B1 * | 8/2002 | Boucher | H04L 12/5693 709/230 |
| 6,567,931 | B1 * | 5/2003 | Jue | G06F 1/30 713/310 |
| 6,609,151 | B1 * | 8/2003 | Khanna | G06F 9/4411 709/208 |
| 6,760,850 | B1 * | 7/2004 | Atkinson | G06F 1/24 713/300 |
| 6,915,346 | B1 * | 7/2005 | Kato | H04L 12/58 709/208 |
| 7,003,607 | B1 * | 2/2006 | Gulick | G06F 13/4027 709/223 |
| 7,624,260 | B2 * | 11/2009 | Ethier | G06F 9/4403 713/1 |
| 7,987,249 | B2 * | 7/2011 | Levy | H04L 41/0654 709/223 |
| 8,069,293 | B1 * | 11/2011 | Rogan | G06F 13/385 370/248 |
| 8,286,011 | B2 * | 10/2012 | Satsangi | G06F 1/3209 713/300 |
| 2001/0005894 | A1 * | 6/2001 | Fukui | G06F 1/26 713/310 |
| 2002/0078187 | A1 * | 6/2002 | Rawson, III | H04L 12/2602 709/222 |
| 2003/0084381 | A1 * | 5/2003 | Gulick | G06F 11/0757 714/47.1 |
| 2003/0165152 | A1 * | 9/2003 | Mills | H04L 12/12 370/422 |
| 2004/0030745 | A1 * | 2/2004 | Boucher | H04L 12/5693 709/203 |
| 2004/0078480 | A1 * | 4/2004 | Boucher | H04L 29/06 709/237 |
| 2004/0141461 | A1 * | 7/2004 | Zimmer | H04L 41/0663 370/216 |
| 2004/0213289 | A1 * | 10/2004 | Liu | H04L 12/12 370/469 |
| 2005/0128515 | A1 * | 6/2005 | Ohno | H04N 1/00204 358/1.15 |
| 2005/0144493 | A1 * | 6/2005 | Cromer | G06F 9/4416 713/310 |
| 2005/0166213 | A1 * | 7/2005 | Cromer | H04L 12/12 719/315 |
| 2005/0221869 | A1 * | 10/2005 | Liu et al. | G06F 1/3209 455/574 |
| 2005/0237160 | A1 * | 10/2005 | Nolan | G06K 19/0705 340/10.33 |
| 2007/0038939 | A1 * | 2/2007 | Challen | G05B 15/02 715/734 |
| 2007/0224978 | A1 * | 9/2007 | Wherry | H04L 12/581 455/414.2 |
| 2008/0141015 | A1 * | 6/2008 | Chalemin | G06F 9/4416 713/2 |
| 2009/0247241 | A1 * | 10/2009 | Gollnick | G06F 1/1626 455/574 |
| 2009/0282275 | A1 * | 11/2009 | Yermalayeu | G06F 1/3203 713/320 |
| 2010/0005479 | A1 * | 1/2010 | Avasthi | G06F 1/3203 719/318 |
| 2010/0031297 | A1 * | 2/2010 | Klein | H04L 12/12 725/78 |
| 2010/0058088 | A1 * | 3/2010 | Busch | G06F 1/3203 713/323 |
| 2010/0161121 | A1 * | 6/2010 | Finsterwalder | G05B 19/41835 700/245 |
| 2011/0004778 | A1 * | 1/2011 | Tsukamoto | G06F 1/3278 713/324 |
| 2011/0157992 | A1 * | 6/2011 | Strasser | G06F 1/183 365/185.18 |
| 2011/0264937 | A1 * | 10/2011 | Meisner | G06F 1/3228 713/323 |
| 2012/0210112 | A1 * | 8/2012 | Suganami | H04L 12/12 713/2 |
| 2012/0311620 | A1 * | 12/2012 | Conklin | H04N 21/442 725/14 |
| 2013/0019042 | A1 * | 1/2013 | Ertugay | G06F 13/385 710/267 |
| 2013/0205153 | A1 * | 8/2013 | Yokoyama | G06F 1/3275 713/323 |
| 2013/0254361 | A1 | 9/2013 | Liu et al. | |
| 2014/0359089 | A1 * | 12/2014 | Davis | G06F 15/177 709/221 |
| 2015/0095676 | A1 * | 4/2015 | Puthiyedath | G06F 1/3234 713/323 |

FOREIGN PATENT DOCUMENTS

| | | |
|---|---|---|
| CN | 101404583 B | 5/2011 |
| TW | 200500934 | 1/2005 |
| TW | 200511003 | 3/2005 |
| TW | 201209577 | 3/2012 |
| TW | 201340663 | 10/2013 |

OTHER PUBLICATIONS

AMD, "Magic Packet Adapter Card Implementation", 1997.*
AMD, "Magic Packet Technology Application in Hardware and Software", 1996.*
AMD, "Magic Packet Technology", 1995.*
AMD, "Am79C970A", 2000.*
AMD, "Am79C961A", 2000.*
Christensen et al., "Enabling Power Management for Network-attached Computers", 1998.*
Simpson, "The Point-to-Point Protocol (PPP) for the Transmission of Multi-protocol Datagrams over Point-to-Point Links", RFC 1331, 1992.*
Werstein, "An Experimental Network Proxy for Power Managed End Nodes", 2008.*
Jimeno et al., "A Network Connection Proxy to Enable Hosts to Sleep and Save Energy", 2008.*
Loseby et al., "Use of SPARK in a Resource Constrained Embedded System", 2009.*
Bugnion et al., "Disco: Running Commodity Operating Systems on Scalable Multiprocessors", 1997.*
Duflot et al., "Can you still trust your network card?", 2010.*
Gobriel et al., "EE-AOC: Energy Efficient Always-On-Connectivity Architecture", 2012.*
AMD, "Magic Packet Adapter Card Implementation", Publication 21385, 1997.*
AMD, "Magic Packet Technology", Publication 20213, 1995.*
Olsen et al., "PowerNap: An Efficient Power Management Scheme for Mobile Devices", 2006.*
Cline, "Alert Standard Format (ASF) Specification Version 2.0", 2003.*
Balogh, "Memory Acquisition by Using Network Card", 2014.*
Peter et al., "30 Seconds is Not Enough! A Study of Operating System Timer Usage", 2008.*
"Office Action of Taiwan Counterpart Application," issued on Apr. 24, 2015, with English translation, p. 1-p. 14, in which the listed references were cited.

* cited by examiner

COMPUTER SYSTEM AND REMOTE CONTROL METHOD THEREOF

CROSS-REFERENCE TO RELATED APPLICATION

This application claims the priority benefit of Taiwan application serial no. 102140905, filed on Nov. 11, 2013. The entirety of the above-mentioned patent application is hereby incorporated by reference herein and made a part of this specification.

BACKGROUND OF THE INVENTION

1. Field of the Invention

The invention relates to a remote control method, and more particularly to a remote control method for a computer system via network.

2. Description of Related Art

The rapid advancement in technology allows more and more information to be shared via the internet. Therefore, if system managers can control and monitor the operation of a computer system remotely, they will be able to carry out the management with greater convenience. Generally, in order to monitor the internal operation of the computer system, a baseboard management controller (BMC) disposed on the motherboard is usually utilized to monitor the computer system. The BMC is capable of detecting the value read by each of the sensors that respectively sense the operation of the elements in the computer system, thereby monitoring the operation of each element within the computer system (such as the speed of a fan or the temperature of a processor). However, when it comes to the system such as cloud computing or a storage center that processes a lot of calculation, a large number of computers is usually required for the work. If the BMC is to be disposed in every computer, an additional cost will inevitably increase.

SUMMARY OF THE INVENTION

The invention provides a remote control method for a computer system, in which a network card or a timer is used to wake up the processor to process the management interface request so as to achieve the purpose of controlling the computer system remotely.

The invention provides a remote control method of a computer system adaptable for a computer system having a network card and a processor. The method includes the following steps. In the method, the network card is used to receive a management interface request sent by a remote device through a network and send a system management interrupt to the processor, so as to wake up the processor and control the processor to enter a system management mode. Thereafter, the processor loads the management monitoring program into the memory to execute the management monitoring program. Finally, the processor processes the management interface request by using the management monitoring program in the system management mode, and replies a processing result to the remote device through the network by using the network card.

In an embodiment of the invention, the network card supports a Wake-on-LAN (WOL) function. The step of sending the system management interrupt to the processor to wake up the processor and control the processor to enter the system management mode includes sending the system management interrupt to the processor according to the received management interface request to wake up the processor and control the processor to inter the system management mode.

In an embodiment of the invention, after the step of receiving the management interface request sent by a remote device through a network by using the network card, the method further stores the management interface request in a temporary storage device of the network card.

In an embodiment of the invention, the step of sending the system management interrupt to the processor to wake up the processor and control the processor to enter a system management mode includes regularly sending the system management interrupt to the processor to wake up the processor by using a timer.

In an embodiment of the invention, after the step of sending the system management interrupt to the processor to wake up the processor and control the processor to enter the system management mode, the method further includes the following steps. The processor checks whether the management interface request is stored in the temporary storage device of the network card. When it is determined that the management interface request is stored in the temporary storage device, the processor loads the management monitoring program into the memory so as to execute the management monitoring program. The processor processes the management interface request in the system management mode by using the management monitoring program, and replies a processing result to the remote device through the network by using the network card.

In an embodiment of the invention, the step of checking whether the management interface request is stored in the temporary storage device of the network card further controls the processor to enter a power saving mode and resets the timer when it is determined that the management interface request is not stored in the temporary storage device.

In an embodiment of the invention, after the processor processes the management interface request in the system management mode by using the management monitoring program and sends the processing result to the remote device through the network by using the network card, the method further controls the processor to enter the power saving mode.

The invention also provides a computer system including a network card, a memory, and a processor, wherein the network card is connected to a remote device through a network and receives a management interface request sent by the remote device. The processor is connected to the network card and the memory to wake up from the power saving mode and enter the system management mode when receiving a system management interrupt. The processor loads the management monitoring program into the memory to execute the management monitoring program when being woken up, processes the management interface request received by the network card in the system management mode by using the management monitoring program, and replies the processing result to the remote device by using the network card.

In an embodiment of the invention, the network card supports a Wake-on-LAN (WOL) function. After receiving the management interface request, the network card further sends the system management interrupt to the processor to wake up the processor and control the processor to enter and system management mode.

In an embodiment of the invention, the network card further includes a temporary storage device for storing the management interface request.

In an embodiment of the invention, the computer system further includes a timer. The timer is connected to the processor for regularly sending the system management interrupt to the processor to wake up the processor.

In an embodiment of the invention, after being woken up, the processor further checks whether the management interface request is stored in the temporary storage device of the network card, and loads the management monitoring program into the memory to execute the management monitoring program when it is determined that the management interface request is stored in the temporary storage device, and processes the management interface request by using the management monitoring program.

In an embodiment of the invention, when it is determined that the management interface request is not stored in the temporary storage device, the processor further enters the power saving mode.

In an embodiment of the invention, after replying the processing result to the remote device via the network by using the network card, the processor further enters the power saving mode and resets the timer.

In an embodiment of the invention, after replying the processing result to the remote device via the network by using the network card, the processor further enters the power saving mode.

Based on the above, the invention provides a computer system and a remote control method thereof. After the remote device sends the management interface request to the computer system, the network card or the timer in the computer system sends the system management interrupt to the processor in the computer system, allowing the processor to enter the system management mode to process the management interface request by using the management monitoring program. After processing the management interface request, the processor may reply the processing result to the remote device and resume to the power saving mode. By using the aforementioned method, the computer system may allow the system manager to carry out remote control via the network without the BMC.

In order to make the aforementioned features and advantages of the invention more comprehensible, embodiments accompanying figures are described in detail below.

DESCRIPTION OF EMBODIMENTS

The invention uses a soft defining method to control a processor to enter a system management mode (SMM) to execute the function that is initially provided by a baseboard management controller (BMC), allowing the computer system to support remote control without the BMC. In addition, when a system management request sent from a remote end is received, the invention further uses a network card having the Wake-on-LAN (WOL) function to wake up the processor directly to process the request to realize remote control. Even if the network card does not have a WOL function, the invention may also use a timer to wake up the processor to process the request regularly, which equally realizes remote control. Accordingly, the purpose of controlling the computer system remotely may be achieved without increasing the cost for disposing hardware while the power can be saved.

Figure 1:
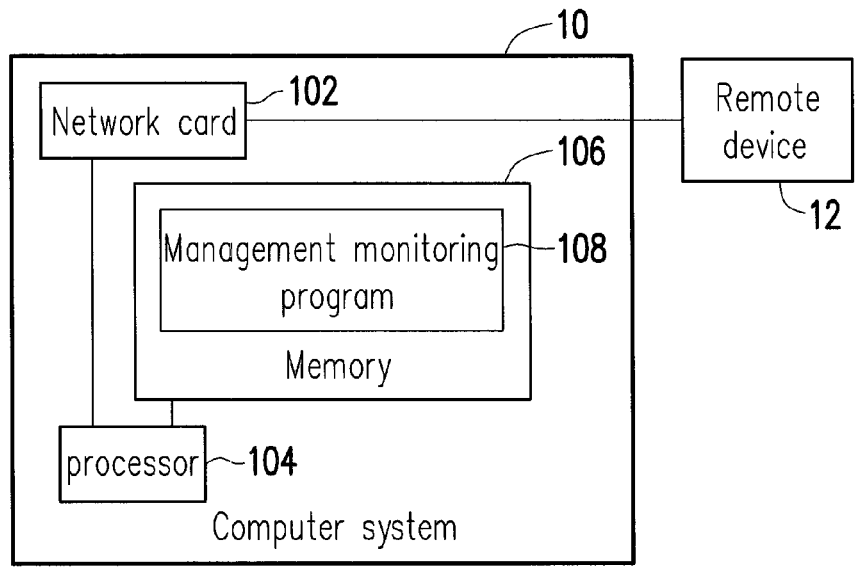
FIG. 1 is a block diagram illustrating a computer system according to an embodiment of the invention.

FIG. 1 is a block diagram illustrating a computer system 10 according to an embodiment of the invention. Please refer to FIG. 1. In the embodiment, the computer system 10 includes a network card 102, a memory 106, and a processor 104. In the embodiment, the computer system 10 is, for example, a server system. The network card 102 is, for example, a network interface card (NIC) that supports the WOL function. The memory 106 may store a management monitoring program 108. The memory 106 is, for example, a static random access memory (SRAM), a dynamic random access memory (DRAM), a magnetoresistive random access memory (MRAM), a phase-change random access memory (PRAM), and so on; the invention provides no limitation thereto. The processor 104 is connected to the network card 102 and the memory 106. The processor 104 is, for example, a central processing unit (CPU) or a programmable microprocessor, a digital signal processor (DSP), a programmable controller, application specific integrated circuits (ASIC), a programmable logic device (PLD), or other hardware devices that have calculating capability.

Figure 2:
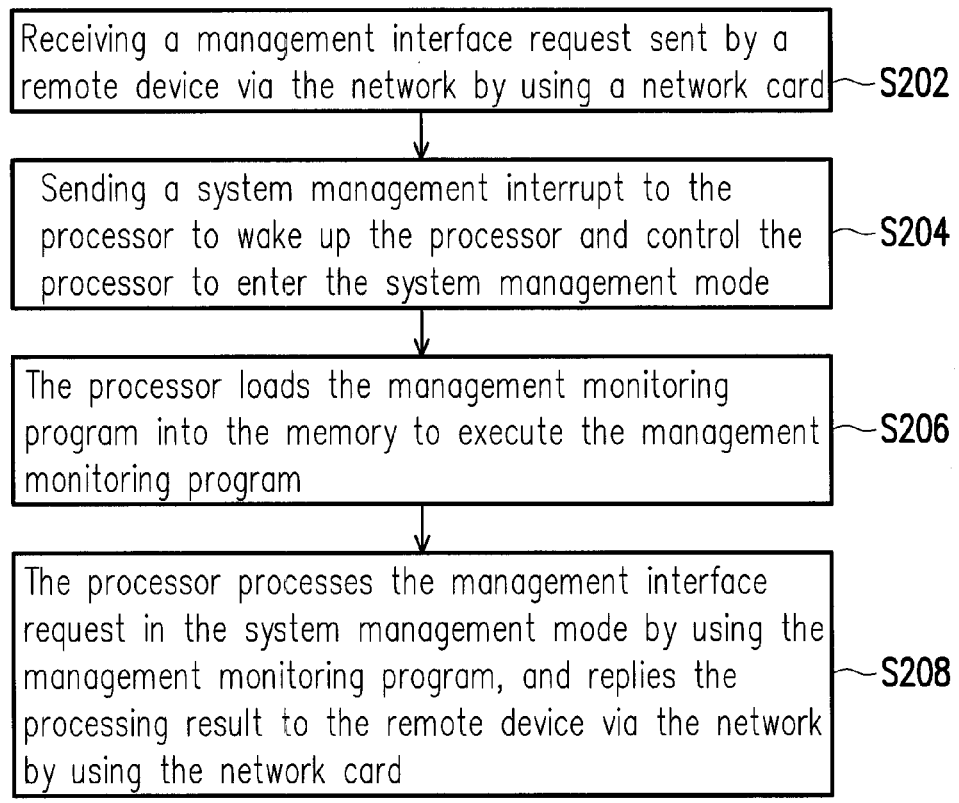
FIG. 2 is a flowchart illustrating a remote control method of a computer system according to an embodiment of the invention.

FIG. 2 is a flowchart illustrating a remote control method of a computer system according to an embodiment of the invention. Please refer to both FIG. 1 and FIG. 2. In the embodiment, the remote control method is adapted to the computer system 10 in FIG. 1, and it is assumed that the processor 104 of the computer system 10 is in a power saving mode such as sleep mode, hibernate mode, or power-off mode, such that the processor 104 may be automatically woken up to execute the remote control function according to the management interface request sent by the remote device 12. The steps in FIG. 2 are described in detail below accompanying with the elements shown in FIG. 1.

In step S202, the computer system 10 receives the management interface request sent by the remote device 12 via the network by using the network card 102. For example, when the system administrator wants to check whether the computer system 10 in the cloud computing center works properly, the remote device 12 may be used to send the management interface request to the computer system 10 via the network, and the request will be received by the network card 102 of the computer system 10. In the embodiment, the management interface is, for example, an intelligent platform management interface (IPMI), which may be used in different operating systems, software, and hardware platform for monitoring, controlling and replying the operation of the computer system 10. In the embodiment, the computer system 10 uses the network card 102 to replace the BMC to receive the management interface request, thereby executing the remote control function.

After receiving the management interface request, the network card 102 that supports the WOL function may use the same to wake up the processor 104. In step S204, the network card 102, for example, sends the system management interrupt (SMI) to the processor 104 so as to wake up the processor 104 and control the processor 104 to enter the system management mode (SMM). It should be noted that, in the embodiment, the network card 102 wakes up the processor 104 that is in the power saving mode by sending SMI to the processor 104. In another embodiment, when the processor 104 is in a normal mode, the network card 102 controls the processor 104 to enter SMM by sending SMI to the processor 104; the invention provides no limitation thereto.

Thereafter, in step S206, the processor 104 loads the management monitoring program 108 into the memory 106 to execute the management monitoring program 108. It should be noted that, in the embodiment, the management monitoring program 108 that is used to be stored in the BMC is transferred to the read only memory (ROM) that stores a basic input output system (BIOS), or transferred to another nonvolatile memory (such as a flash memory), so that when being woken up, the processor 104 may realize the management monitoring function originally provided by the BMC through executing the management monitoring program 108.

Then, in step S208, the processor 104 processes the management interface request in the SMM by using the management monitoring program 108, and replies the processing result obtained by processing the management interface request to the remote device 12 through the network by using the network card 102. Unlike the conventional method in which the SMM has to be started by the operation system or a system chipset (such as a south bridge chip or a north bridge chip), in the embodiment, the network card 102 directly sends the SMI to the processor 104 so as to control the processor 104 to enter the SMM. In addition, the embodiment also takes advantage of the characteristic of IPMI that can operate independently without the operation system to simulate the manner that BMC processes IPMI request, in which the processor 104 that already enters the SMM directly processes the management interface request received by the network card 102. Accordingly, the sensors disposed in the computer system 10 are controlled to execute the monitoring function without starting the operation system. Finally, the processor 104 encapsulates the result obtained by processing the management interface request by the management monitoring program 108 to be an information complied with IPMI format, and replies the encapsulated result to the remote device 12 through the network by using the network card 102, thereby allowing the system administrator at a remote end to know the operation of the computer system 10. After the management monitoring program 108 replies the processing result, the processor 104, for example, resumes to the initial power saving mode to save energy and power. On the other hand, after the processor 104 resumes to the power saving mode, the management monitoring program 108 loaded into the memory 106 is erased. To understand this from another perspective, every time when the network card 102 receives the management interface request and wakes up the processor 104, the processor 104 executes the management monitoring program 108 so as to process the management interface request and reply the processing result.

It should be noted that, in a conventional computer system that adopts the BMC, the sensors that are disposed on each element in the computer system are connected to the BMC. Accordingly, the BMC may determine the operation of the computer system based on the value read by each sensor. In the embodiment, the sensors disposed in the computer system are, for example, connected to the control chipset in the computer system 10. Therefore, the processor 104 of the computer system 10 may receive the values read by the sensors via the control chipset, thereby determining the operation of the computer system 10.

In the aforementioned embodiment, with the WOL function supported by the network card 102, the computer system 10 may wake up the processor 104 depending on the network card 102. However, in the circumstances where the network card 102 does not support the WOL function, the invention provides an alternative method in which an independent timer is used to wake up the processor 204 regularly so as to process the management interface request received by the network card 102.

Figure 3:
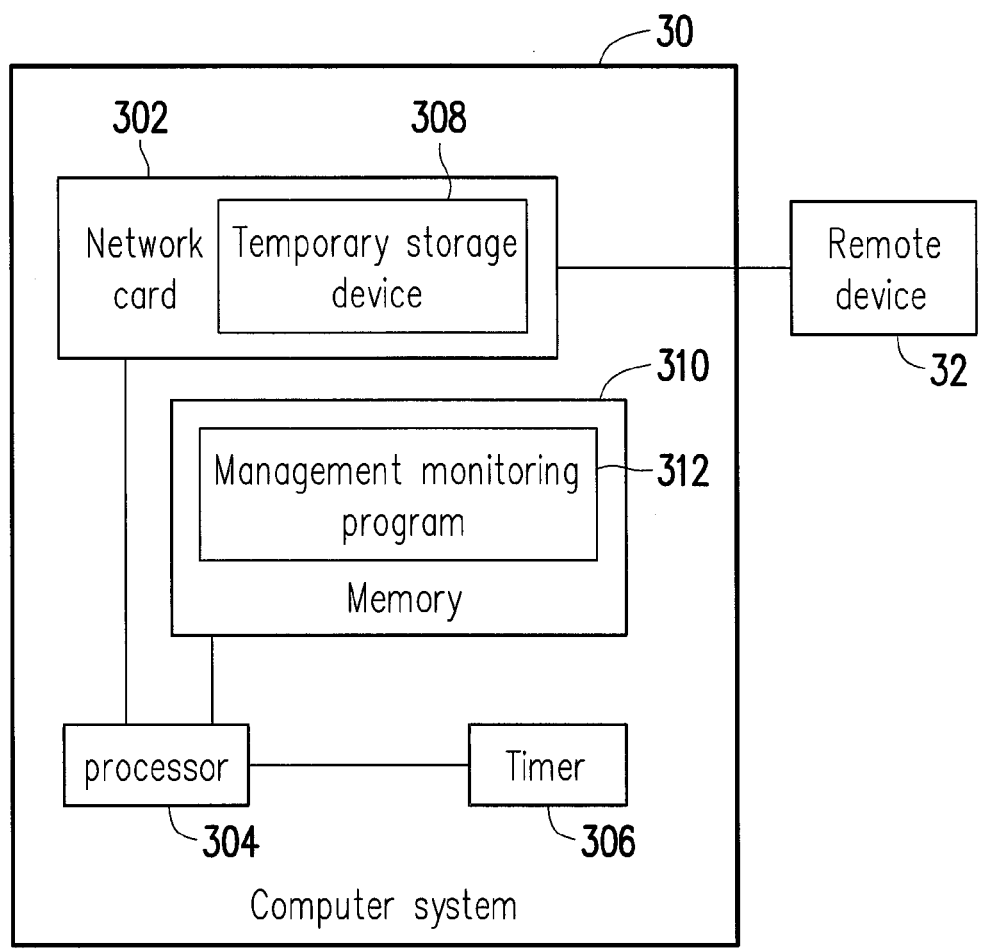
FIG. 3 is a block diagram illustrating a computer system according to another embodiment of the invention.

Specifically, FIG. 3 is a block diagram illustrating a computer system 30 according to another embodiment of the invention. Please refer to FIG. 3. In the embodiment, the computer system 30 includes a network card 302, a processor 304, a timer 306, and a memory 310, in which the network card 302 further includes a temporary storage device 308. The temporary storage device 308 may be a buffer, such as a static random access memory (SRAM), a dynamic random access memory (DRAM), a magnetoresistive random access memory (MRAM), or a phase-change random access memory (PRAM); the invention provides no limitation thereto. In the embodiment, the types and functions of the computer system 30, the network card 302, the processor 304, and the memory 310 are the same or similar to those of the computer system 10, the network card 102, the processor 104, and the memory 106 in FIG. 1; therefore, no further description is incorporated herein. The difference between them lies in that the network card 302 in the embodiment does not support the WOL function.

Figure 4:
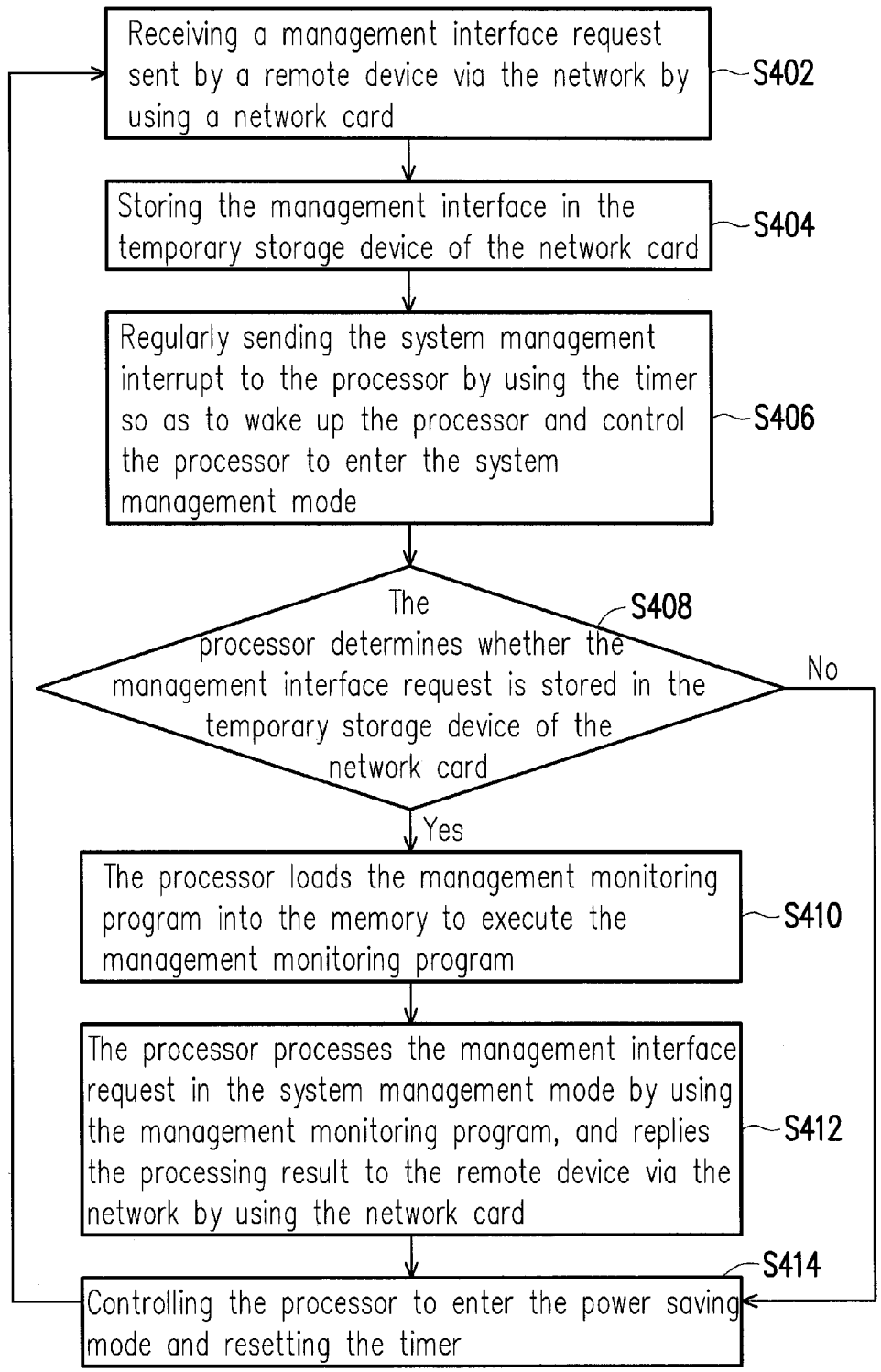
FIG. 4 is a flowchart illustrating a remote control method of a computer system according to another embodiment of the invention.

FIG. 4 is a flowchart illustrating a remote control method of a computer system according to another embodiment of the invention. Please refer to both FIG. 3 and FIG. 4. In the embodiment, the remote control method is adapted to the computer system 30 in FIG. 3, and it is assumed that the processor 304 of the computer system 30 is in a power saving mode such as sleep mode, hibernate mode, or power-off mode. The steps in FIG. 3 are described in detail below accompanying with the elements shown in FIG. 4.

In step S402, the network card 302 in the computer system 30 receives the management interface request sent by a remote device 32 through the network. Thereafter, in step S404, the network card 302 stores the received management interface request in the temporary storage device 308 thereof.

In step S406, the computer system 30 uses the timer 306 to regularly send SMI to the processor 304 so as to wake up the processor 304 and control the processor 304 to enter the SMM. After being woken up, the processor 304 checks whether the management interface request is stored in the temporary storage device 308 of the network card 302. When the processor 304 determines that the management interface request is stored in the temporary storage device 308, step S410 is then carried out. The processor 304 loads the management monitoring program 312 into the memory 310 to execute the management monitoring program 312. Then, step S412 is carried out. The processor 304 processes the management interface request in SMM by using the management monitoring program 312, and replies the processing result obtained by processing the management interface request to the remote device 32 through the network by using the network 302. The functions and the operating method of the management monitoring program 312 are the same as or similar to those of the management monitoring program 108; therefore, no further description is incorporated herein.

Finally, in step S414, the processor 304 enters the power saving mode again to save power, and the processor 304 resets the timer 306 at the same time so that the timer 306 is able to wake up the processor 304 again to check the management interface request at a next time point. On the other hand, in step S408, when the processor 304 determines that the management interface request is not stored in the temporary storage device 308 of the network card 302, step S414 is carried out directly to enter the power saving mode, and the timer 306 is reset. After the processor 304 enters the power saving mode, the management monitoring program 312 loaded into the memory 310 is erased.

With the method of waking up the processor 304 regularly to check and process the management interface request, the computer system 30 may replace the BMC with the processor

304 so as to execute the remote control function required by the management interface request while the power can be saved.

In summary, in the invention, the computer system and the remote control method thereof adopt the network card or the timer to wake up the processor, and the processor executes the management monitoring program in the SMM to process the management interface request. Accordingly, the processor may replace the conventional BMC while maintaining the complete IPMI function so as to achieve the purpose of saving costs for disposing hardware. In addition, when the processor finishes executing the management interface request or when the network card does not receive the management interface request, the invention further controls the processor to enter the power saving mode so that the power may be saved at the same time.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A remote control method of a computer system, adapted to a computer system having a network card and a processor, comprising:
    receiving a management interface request sent by a remote device via a network by using the network card;
    sending a system management interrupt to the processor to wake up the processor and control the processor to enter a system management mode;
    the processor loading a management monitoring program into a memory to execute the management monitoring program; and
    the processor processing the management interface request in the system management mode by using the management monitoring program, and replying a processing result to the remote device via the network by using the network card, wherein
    after the step of receiving the management interface request sent by the remote device via the network by using the network card, the method further comprises:
        storing the management interface request in a temporary storage device in the network card;
    the step of sending the system management interrupt to the processor to wake up the processor and control the processor to enter the system management mode comprises:
        regularly sending the system management interrupt to the processor to wake up the processor by using a timer;
    after the step of sending the system management interrupt to the processor to wake up the processor and control the processor to enter the system management mode, the method further comprises:
        the processor checking whether the management interface request is stored in the temporary storage device of the network card;
        the processor loading the management monitoring program into the memory to execute the management monitoring program when it is determined that the management interface request is stored in the temporary storage device; and
        the processor processing the management interface request in the system management mode by using the management monitoring program, and replying the processing result to the remote device via the network by using the network card.

2. The remote control method according to claim 1, wherein the network card supports a Wake-on-LAN (WOL) function, and the step of sending the system management interrupt to the processor to wake up the processor and control the processor to enter the system management mode comprises:
    the network card sending the system management interrupt to the processor to wake up the processor according to the received management interface request and control the processor to enter the system management mode.

3. The remote control method according to claim 1, wherein the step of checking whether the management interface request is stored in the temporary storage device of the network card further comprises:
    controlling the processor to enter a power saving mode and resetting the timer when it is determined that the management interface request is not stored in the temporary storage device.

4. The remote control method according to claim 1, wherein after the processor processes the management interface request in the system management mode by using the management monitoring program, and replies the processing result to the remote device via the network by using the network card, the method further comprises:
    controlling the processor to enter a power saving mode and resetting the timer.

5. The remote control method according to claim 1, wherein after the processor process the management interface request in the system management mode by using the management monitoring program, and replies the processing result to the remote device via the network by using the network card, the method further comprises:
    controlling the processor to enter a power saving mode.

6. A computer system, comprising:
    a network card comprising a temporary storage device, connected to a remote device via a network and configured to receive a management interface request sent by the remote device and store the management interface request in the temporary storage device;
    a memory;
    a processor, connected to the network card and the memory, and configured to wake up from a power saving mode and enter a system management mode when receiving a system management interrupt; and
    a timer, connected to the processor and configured to regularly send the system management interrupt to the processor to wake up the processor, wherein
    the processor loads a management monitoring program into a memory to execute the management monitoring program when being woken up, and processes the management interface request received by the network card in the system management mode by using the management monitoring program, and replies a processing result to the remote device via the network by using the network card, and
    the processor checks whether the management interface request is stored in the temporary storage device of the network card when being woken up, loads the management monitoring program into the memory to execute the management monitoring program when it is determined that the management interface request is stored in the temporary storage device, and processes the management interface request by using the management monitoring program.

7. The computer system according to claim 6, wherein the network card supports a Wake-on-LAN (WOL) function, and further sends the system management interrupt to the processor to wake up the processor and control the processor to enter the system management mode when receiving the management interface request.

8. The computer system according to claim 6, wherein the processor further enters a power saving mode when it is determined that the management interface request is not stored in the temporary storage device.

9. The computer system according to claim 6, wherein the processor enters a power saving mode and resets the timer after replying the processing result to the remote device via the network by using the network card.

10. The computer system according to claim 6, wherein the processor further enters a power saving mode after replying the processing result to the remote device via the network by using the network card.

* * * * *